US012562131B2

(12) United States Patent
Yoo et al.

(10) Patent No.: US 12,562,131 B2
(45) Date of Patent: Feb. 24, 2026

(54) DISPLAY DEVICE AND ELECTRONIC DEVICE INCLUDING THE DISPLAY DEVICE

(71) Applicant: Samsung Display Co., LTD., Yongin-si (KR)

(72) Inventors: Gi-Na Yoo, Yongin-si (KR); Hyomin Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/051,009

(22) Filed: Feb. 11, 2025

(65) Prior Publication Data

US 2025/0356811 A1 Nov. 20, 2025

(30) Foreign Application Priority Data

May 20, 2024 (KR) ........................ 10-2024-0065131

(51) Int. Cl.
*G09G 3/3291* (2016.01)

(52) U.S. Cl.
CPC ... *G09G 3/3291* (2013.01); *G09G 2320/0257* (2013.01); *G09G 2360/16* (2013.01)

(58) Field of Classification Search
CPC ... G09G 3/30-3291; G09G 2320/0257; G09G 2360/16; G09G 2320/043-048
See application file for complete search history.

(56) References Cited

U.S. PATENT DOCUMENTS

| | | | | |
|---|---|---|---|---|
| 6,337,542 B1 * | 1/2002 | Hanaki | G09G 3/3216 345/215 |
| 7,675,492 B2 | 3/2010 | Park et al. | |
| 2009/0096770 A1 * | 4/2009 | Kawabe | G09G 3/006 345/204 |
| 2022/0139311 A1 * | 5/2022 | Yoo | G09G 3/3233 345/690 |

FOREIGN PATENT DOCUMENTS

KR 10-2022-0060113 5/2022

* cited by examiner

*Primary Examiner* — Hang Lin
(74) *Attorney, Agent, or Firm* — Womble Bond Dickinson (US) LLP

(57) ABSTRACT

A display device may include a driving controller to generate output image data, a data driver to generate data voltages, and a display panel to display an image, wherein the driving controller is configured to divide the display panel into blocks, calculate accumulated degradation data for the blocks based on the output image data, calculate lifetime data of the blocks based on the accumulated degradation data, compare a difference value between the lifetime data for a first block and the lifetime data for a second block with a threshold value, determine a block with larger lifetime data between the first and second blocks as a long lifetime block when the difference value is greater than or equal to the threshold value, generate forced degradation data to degrade the long lifetime block, and generate the output image data by applying the forced degradation data to the input image data.

20 Claims, 20 Drawing Sheets

FIG. 2

100

| j \ i | 1 | 2 | 3 | 4 | 5 | 6 | 7 | 8 | 9 | 10 |
|---|---|---|---|---|---|---|---|---|---|---|
| 1 | 100 | 99 | 99 | 98 | 98 | 100 | 97 | 100 | 100 | 98 |
| 2 | 99 | 99 | 98 | 100 | 100 | 98 | 98 | 97 | 98 | 98 |
| 3 | 100 | 99 | 98 | 100 | 99 | 100 | 99 | 93 | 98 | 98 |
| 4 | 100 | 98 | 95 | 95 | 95 | 99 | 99 | 93 | 100 | 99 |
| 5 | 100 | 95 | 94 | 98 | 99 | 99 | 98 | 93 | 99 | 100 |
| 6 | 98 | 95 | 100 | 99 | 99 | 99 | 98 | 98 | 97 | 99 |
| 7 | 98 | 98 | 99 | 100 | 100 | 98 | 99 | 100 | 100 | 100 |
| 8 | 99 | 99 | 98 | 100 | 99 | 99 | 99 | 99 | 99 | 99 |
| 9 | 99 | 99 | 98 | 98 | 98 | 100 | 98 | 99 | 100 | 99 |
| 10 | 98 | 99 | 100 | 100 | 99 | 98 | 99 | 99 | 98 | 99 |

FIG. 3A

100

| j \ i | 1 | 2 | 3 | 4 | 5 | 6 | 7 | 8 | 9 | 10 |
|---|---|---|---|---|---|---|---|---|---|---|
| 1 | | 1.0 | 0.0 | 1.0 | 0.0 | 2.0 | 3.0 | 3.0 | 0.0 | 2.0 |
| 2 | | 0.0 | 1.0 | 2.0 | 0.0 | 2.0 | 0.0 | 1.0 | 1.0 | 0.0 |
| 3 | | 1.0 | 1.0 | 2.0 | 1.0 | 1.0 | 1.0 | 6.0 | 5.0 | 0.0 |
| 4 | | 2.0 | 3.0 | 0.0 | 0.0 | 4.0 | 0.0 | 6.0 | 7.0 | 1.0 |
| 5 | | 5.0 | 1.0 | 4.0 | 1.0 | 0.0 | 1.0 | 5.0 | 6.0 | 1.0 |
| 6 | | 3.0 | 5.0 | 1.0 | 0.0 | 0.0 | 0.0 | 1.0 | 1.0 | 2.0 |
| 7 | | 0.0 | 1.0 | 1.0 | 0.0 | 2.0 | 1.0 | 1.0 | 0.0 | 0.0 |
| 8 | | 0.0 | 0.0 | 1.0 | 0.0 | 2.0 | 1.0 | 1.0 | 0.0 | 0.0 |
| 9 | | 0.0 | 1.0 | 0.0 | 0.0 | 2.0 | 2.0 | 1.0 | 1.0 | 1.0 |
| 10 | | 1.0 | 1.0 | 0.0 | 1.0 | 1.0 | 1.0 | 0.0 | 1.0 | 1.0 |

FIG. 3B

100

| j \ i | 1 | 2 | 3 | 4 | 5 | 6 | 7 | 8 | 9 | 10 |
|---|---|---|---|---|---|---|---|---|---|---|
| 1 | 100 | 99 | 99 | 98 | 98 | 100 | 97 | 100 | 100 | 98 |
| 2 | 99 | 99 | 98 | 100 | 100 | 98 | 98 | 97 | 98 | 98 |
| 3 | 100 | 99 | 98 | 100 | 99 | 100 | 99 | 93 | 98 | 98 |
| 4 | 100 | 98 | 95 | 95 | 95 | 99 | 99 | 93 | 100 | 99 |
| 5 | 100 | 95 | 94 | 98 | 99 | 99 | 98 | 93 | 99 | 100 |
| 6 | 98 | 95 | 100 | 99 | 99 | 99 | 98 | 98 | 97 | 99 |
| 7 | 98 | 98 | 99 | 100 | 100 | 98 | 99 | 100 | 100 | 100 |
| 8 | 99 | 99 | 98 | 100 | 99 | 99 | 99 | 99 | 99 | 99 |
| 9 | 99 | 99 | 98 | 98 | 98 | 100 | 98 | 99 | 100 | 99 |
| 10 | 98 | 99 | 100 | 100 | 99 | 98 | 99 | 99 | 98 | 99 |

FIG. 4A

100

| j \ i | 1 | 2 | 3 | 4 | 5 | 6 | 7 | 8 | 9 | 10 |
|---|---|---|---|---|---|---|---|---|---|---|
| 1 | | | | | | | | | | |
| 2 | 1.0 | 0.0 | 1.0 | 2.0 | 2.0 | 2.0 | 1.0 | 3.0 | 2.0 | 0.0 |
| 3 | 1.0 | 0.0 | 0.0 | 0.0 | 1.0 | 2.0 | 1.0 | 4.0 | 0.0 | 0.0 |
| 4 | 0.0 | 1.0 | 3.0 | 5.0 | 4.0 | 1.0 | 0.0 | 0.0 | 2.0 | 1.0 |
| 5 | 0.0 | 3.0 | 1.0 | 3.0 | 4.0 | 0.0 | 1.0 | 0.0 | 1.0 | 1.0 |
| 6 | 2.0 | 0.0 | 6.0 | 1.0 | 0.0 | 0.0 | 0.0 | 5.0 | 2.0 | 1.0 |
| 7 | 0.0 | 3.0 | 1.0 | 1.0 | 1.0 | 1.0 | 0.0 | 2.0 | 3.0 | 1.0 |
| 8 | 1.0 | 1.0 | 0.0 | 0.0 | 1.0 | 1.0 | 0.0 | 1.0 | 1.0 | 1.0 |
| 9 | 0.0 | 0.0 | 1.0 | 2.0 | 1.0 | 1.0 | 1.0 | 0.0 | 1.0 | 0.0 |
| 10 | 1.0 | 0.0 | 2.0 | 2.0 | 1.0 | 2.0 | 1.0 | 0.0 | 2.0 | 0.0 |

FIG. 4B

100

| j \ i | 1 | 2 | 3 | 4 | 5 | 6 | 7 | 8 | 9 | 10 |
|---|---|---|---|---|---|---|---|---|---|---|
| 1 | 100 | 99 | 99 | 98 | 98 | 100 | 97 | 100 | 100 | 98 |
| 2 | 99 | 99 | 98 | 100 | 100 | 98 | 98 | 97 | 98 | 98 |
| 3 | 100 | 99 | 98 | 100 | 99 | 100 | 99 | 93 | 98 | 98 |
| 4 | 100 | 98 | 95 | 95 | 95 | 99 | 99 | 93 | 100 | 99 |
| 5 | 100 | 95 | 94 | 98 | 99 | 99 | 98 | 93 | 99 | 100 |
| 6 | 98 | 95 | 100 | 99 | 99 | 99 | 98 | 98 | 97 | 99 |
| 7 | 98 | 98 | 99 | 100 | 100 | 98 | 99 | 100 | 100 | 100 |
| 8 | 99 | 99 | 98 | 100 | 99 | 99 | 99 | 99 | 99 | 99 |
| 9 | 99 | 99 | 98 | 98 | 98 | 100 | 98 | 99 | 100 | 99 |
| 10 | 98 | 99 | 100 | 100 | 99 | 98 | 99 | 99 | 98 | 99 |

FIG. 5

100

| j \ i | 1 | 2 | 3 | 4 | 5 | 6 | 7 | 8 | 9 | 10 |
|---|---|---|---|---|---|---|---|---|---|---|
| 1 | 100 | 99 | 99 | 98 | 98 | 100 | 97 | 100 | 100 | 98 |
| 2 | 99 | 99 | 98 | 100 | 100 | 98 | 98 | 97 | 98 | 98 |
| 3 | 100 | 99 | 98 | 100 | 99 | 100 | 99 | 93 | 98 | 98 |
| 4 | 100 | 98 | 95 | 95 | 95 | 99 | 99 | 93 | 100 | 99 |
| 5 | 100 | 95 | 94 | 98 | 99 | 99 | 98 | 93 | 99 | 100 |
| 6 | 98 | 95 | 100 | 99 | 99 | 99 | 98 | 98 | 97 | 99 |
| 7 | 98 | 98 | 99 | 100 | 100 | 98 | 99 | 100 | 100 | 100 |
| 8 | 99 | 99 | 98 | 100 | 99 | 99 | 99 | 99 | 99 | 99 |
| 9 | 99 | 99 | 98 | 98 | 98 | 100 | 98 | 99 | 100 | 99 |
| 10 | 98 | 99 | 100 | 100 | 99 | 98 | 99 | 99 | 98 | 99 |

FIG. 7B

100

| j \ i | 1 | 2 | 3 | 4 | 5 | 6 | 7 | 8 | 9 | 10 |
|---|---|---|---|---|---|---|---|---|---|---|
| 1 | | | | | | | | | | |
| 2 | | | | | | | | 1.1 | | |
| 3 | | | | 1.1 | 1.1 | | 1.1 | | 1.1 | |
| 4 | | | | | | 1.1 | 1.1 | | 1.08 | |
| 5 | 1.1 | | | 1.08 | 1.08 | | 1.1 | | 1.08 | |
| 6 | | | 1.1 | | | | | 1.01 | | |
| 7 | | | | | | | | | | |
| 8 | | | | | | | | | | |
| 9 | | | | | | | | | | |
| 10 | | | | | | | | | | |

FIG. 8B

100

| j \ i | 1 | 2 | 3 | 4 | 5 | 6 | 7 | 8 | 9 | 10 |
|---|---|---|---|---|---|---|---|---|---|---|
| 1 | | | | | | | | | | |
| 2 | | | | | | | | 1.01 | | |
| 3 | | | | 1.01 | 1.01 | | 1.01 | | 1.01 | |
| 4 | | | | | | 1.01 | 1.01 | | 1.1 | |
| 5 | 1.01 | | | 1.1 | 1.1 | | 1.01 | | 1.1 | |
| 6 | | | 1.01 | | | | | 1.07 | | |
| 7 | | | | | | | | | | |
| 8 | | | | | | | | | | |
| 9 | | | | | | | | | | |
| 10 | | | | | | | | | | |

FIG. 9C

100

| j \ i | 1 | 2 | 3 | 4 | 5 | 6 | 7 | 8 | 9 | 10 |
|---|---|---|---|---|---|---|---|---|---|---|
| 1 | | | | | | | | | | |
| 2 | | | | | | | | 1.1 | | |
| 3 | | | | 1.1 | 1.1 | | 1.1 | | 1.1 | |
| 4 | | | | | | 1.1 | 1.1 | | 1.1 | |
| 5 | 1.1 | | | 1.1 | 1.1 | | 1.1 | | 1.1 | |
| 6 | | | 1.1 | | | | | 1.1 | | |
| 7 | | | | | | | | | | |
| 8 | | | | | | | | | | |
| 9 | | | | | | | | | | |
| 10 | | | | | | | | | | |

DISPLAY DEVICE AND ELECTRONIC DEVICE INCLUDING THE DISPLAY DEVICE

CROSS-REFERENCE TO RELATED APPLICATION(S)

The present application claims priority to, and the benefit of, Korean Patent Application No. 10-2024-0065131, filed on May 20, 2024, in the Korean Intellectual Property Office, the entire disclosure of which is incorporated herein by reference.

BACKGROUND

1. Field

Embodiments of the present disclosure relate to a display device having improved display quality, and a method of operating the display device.

2. Description of the Related Art

As a display device, such as an organic light-emitting diode (OLED) display device, operates over time, light-emitting elements (e.g., OLEDs) of pixels included in the display device may be degraded. When the pixels are degraded, an afterimage may be visible in a display panel of the display device. To reduce or prevent the afterimage, degradation data may be accumulated, and input image data may be compensated based on the accumulated degradation data and a look-up table. Due to the limited capacity of the look-up table and different lifetimes of pixels in different products, the accuracy of a degradation compensation method based on the accumulated degradation data and the look-up table may differ from product to product.

SUMMARY

Embodiments of the present disclosure provide a display device that delays a point in time at which an afterimage is recognized.

Embodiments of the present disclosure provide a method of operating the display device.

In one or more embodiments of a display device according to the present disclosure, the display device may include a driving controller configured to generate output image data based on input image data, a data driver configured to generate data voltages based on the output image data, and a display panel configured to display an image based on the data voltages, wherein the driving controller is further configured to divide the display panel into blocks including a pixel, calculate accumulated degradation data for the blocks based on the output image data, calculate lifetime data representing remaining lifetimes of the blocks based on the accumulated degradation data, compare a difference value between one of the lifetime data for a first block of the blocks and one of the lifetime data for a second block of the blocks adjacent to the first block with a threshold value, determine a block with larger lifetime data between the first block and the second block as a long lifetime block when the difference value is greater than or equal to the threshold value, generate forced degradation data to degrade the long lifetime block, and generate the output image data by applying the forced degradation data to the input image data.

The driving controller may be configured to determine an afterimage boundary between the first block and the second block based on the difference value being greater than or equal to the threshold value.

The afterimage boundary may include a horizontal afterimage boundary between the first block and the second block that is vertically adjacent to the first block.

The afterimage boundary may include a vertical afterimage boundary between the first block and the second block that is horizontally adjacent to the first block.

The forced degradation data for the long lifetime block may include a gain value applied to the input image data for the long lifetime block.

The gain value may be configured to be determined according to a gray level of the input image data for the long lifetime block.

The gain value may be configured to increase as the gray level of the input image data for the long lifetime block decreases.

The gain value may be configured to be determined according to a saturation level of the input image data for the long lifetime block.

The gain value may be configured to increase as the saturation level of the input image data for the long lifetime block increases.

The driving controller may be configured to receive an attention signal having a first level when an attention of a user is detected, and may be configured to receive the attention signal having a second level when the attention of the user is not detected, wherein the gain value is configured to have a maximum value when the driving controller receives the attention signal having the second level.

The forced degradation data for the long lifetime block may include gain values applied to the input image data for the long lifetime block.

The gain values may include a first gain value determined according to a gray level of the input image data for the long lifetime block, and a second gain value determined according to a saturation level of the input image data for the long lifetime block.

The first gain value may be configured to increase when the gray level of the input image data for the long lifetime block decreases, wherein the second gain value is configured to increase when the saturation level of the input image data for the long lifetime block increases.

In one or more embodiments of a display device according to the present disclosure, the display device may include a driving controller configured to generate output image data based on forced degradation data, a data driver configured to generate data voltages based on the output image data, and a display panel configured to display an image based on the data voltages, wherein the driving controller is further configured to divide the display panel into blocks including a pixel, calculate accumulated degradation data corresponding to the blocks based on the output image data, calculate lifetime data corresponding to remaining lifetimes of the blocks based on the accumulated degradation data, compare a difference value between one of the lifetime data for a first block of the blocks and one of the lifetime data for a second block of the blocks with a threshold value, determine a block with larger lifetime data between the first block and the second block as a long lifetime block when the difference value is greater than or equal to the threshold value, generate forced degradation data to degrade the long lifetime block, and generate the forced degradation data as the output image data.

The driving controller may be configured to receive an attention signal having a first level when an attention of a user is detected, and to receive the attention signal having a second level when the attention of the user is not detected, wherein the forced degradation data include a gray level value for emitting light at a brightness for the pixel of the long lifetime block when the driving controller receives the attention signal having the second level.

The brightness may be a maximum brightness of the pixel of the long lifetime block.

In one or more embodiments of an electronic device according to the present disclosure, the electronic device may include a processor configured to provide input image data, a driving controller configured to generate output image data based on input image data, a data driver configured to generate data voltages based on the output image data, and a display panel configured to display an image based on the data voltages, wherein the driving controller is further configured to divide the display panel into blocks including a pixel, calculate accumulated degradation data for the blocks based on the output image data, calculate lifetime data representing remaining lifetimes of the blocks based on the accumulated degradation data, compare a difference value between one of the lifetime data for a first block of the blocks and one of the lifetime data for a second block of the blocks adjacent to the first block with a threshold value, determine a block with larger lifetime data between the first block and the second block as a long lifetime block when the difference value is greater than or equal to the threshold value, generate forced degradation data to degrade the long lifetime block, and generate the output image data by applying the forced degradation data to the input image data.

The forced degradation data for the long lifetime block may include gain values applied to the input image data for the long lifetime block.

The gain values may include a first gain value determined according to a gray level of the input image data for the long lifetime block, and a second gain value determined according to a saturation level of the input image data for the long lifetime block.

The first gain value may be configured to increase when the gray level of the input image data for the long lifetime block decreases, wherein the second gain value is configured to increase when the saturation level of the input image data for the long lifetime block increases.

The display device may compare the remaining lifetime of the adjacent blocks of the plurality of blocks including at least one pixel. In addition, the display device may degrade blocks having relatively long lifetime to make the remaining lifetime of the blocks having relatively long lifetime similar to the blocks having relatively short lifetime. Accordingly, the time at which a user of the display device recognizes the afterimage may be delayed.

BRIEF DESCRIPTION OF THE DRAWINGS

The above and other aspects of the present disclosure will become more apparent by describing in detailed embodiments thereof with reference to the accompanying drawings, in which:

FIG. 2 is a diagram illustrating an example of a plurality of lifetime data of a plurality of blocks that divide a display panel of FIG. 1;

FIG. 3A is a diagram illustrating an example of difference values of a plurality of lifetime data of horizontally adjacent blocks of the plurality of blocks having the plurality of lifetime data of FIG. 2;

FIG. 3B is a diagram illustrating an example of vertical afterimage boundaries based on the difference values of FIG. 3A;

FIG. 4A is a diagram illustrating an example of difference values of a plurality of lifetime data of vertically adjacent blocks of the plurality of blocks having the plurality of lifetime data of FIG. 2;

FIG. 4B is a diagram illustrating an example of horizontal afterimage boundaries based on the difference values of FIG. 3A;

FIG. 5 is a diagram illustrating an example of afterimage boundaries according to one or more embodiments;

FIG. 7B is a diagram illustrating an example of first gain values determined according to the gray level of FIG. 7A for the long lifetime blocks;

FIG. 8B is a diagram illustrating an example of second gain values determined according to the saturation level of FIG. 8A for the long lifetime blocks;

FIG. 9C is a diagram illustrating an example of forced degradation data according to one or more embodiments;

DETAILED DESCRIPTION

Figure 1:
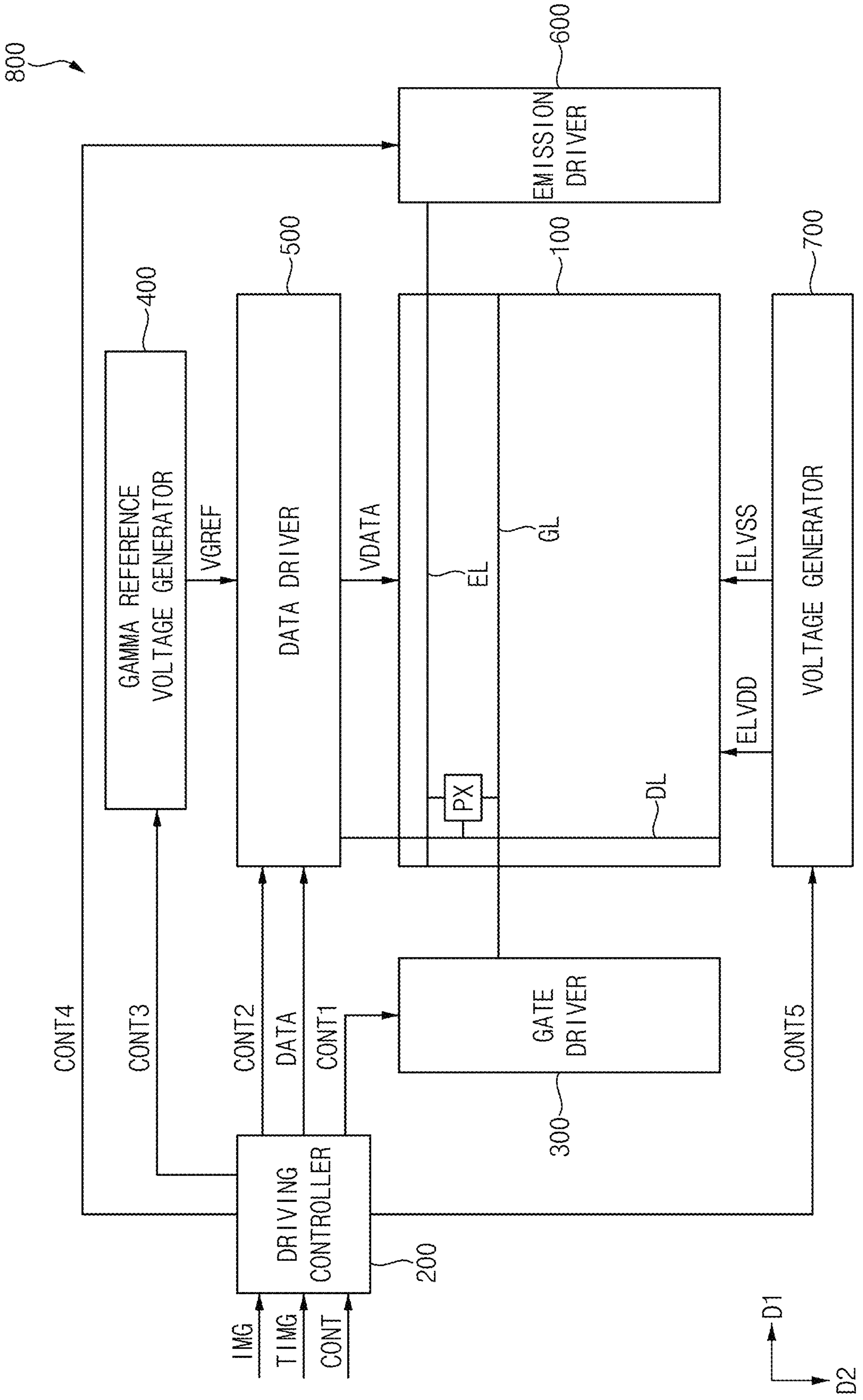
FIG. 1 is a block diagram illustrating a display device according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection.

For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component.

Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XY, YZ, and XZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure.

The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Furthermore, the expression "being the same" may mean "being substantially the same". In other words, the expression "being the same" may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device according to one or more embodiments of the present disclosure.

Referring to FIG. 1, a display device 800 may include a display panel 100 and a display panel driver. The display panel driver may include a driving controller 200, a gate driver 300, a gamma reference voltage generator 400, and a data driver 500. In one or more embodiments, the display device 800 may further include an emission driver 600 and a voltage generator 700.

The display panel 100 may include a display region on which an image is displayed, and a peripheral region adjacent to the display region.

The display panel 100 may include gate lines GL, data lines DL, emission lines EL, and pixels PX electrically connected to the gate lines GL, the data lines DL and the emission lines EL. The gate lines GL may extend in a first direction D1, the data lines DL may extend in a second direction D2 crossing the first direction D1, and the emission lines EL may extend in the first direction D1.

The driving controller 200 may receive input image data IMG and an input control signal CONT from an external apparatus. For example, the input image data IMG may include red image data, green image data, and blue image data. The input image data IMG may include white image data. The input image data IMG may include magenta image data, cyan image data, and yellow image data. The input control signal CONT may include a master clock signal and a data enable signal. The input control signal CONT may further include a vertical synchronizing signal and a horizontal synchronizing signal.

The driving controller 200 may receive an attention signal TIMG for determining whether a user of the display device 800 is attentive. The attention signal TIMG may have a first level when an attention of the user is detected. The attention signal TIMG may have a second level when the attention of the user is not detected.

The driving controller 200 may generate a first control signal CONT1, a second control signal CONT2, a third control signal CONT3, and output image data DATA based on the input image data IMG and the input control signal CONT. In one or more embodiments, the driving controller 200 may further generate a fourth control signal CONT4 and a fifth control signal CONT5.

The driving controller 200 may generate the first control signal CONT1 for controlling an operation of the gate driver 300 based on the input control signal CONT, and may output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and may output the second control signal CONT2 to the data driver 500. The second control signal CONT2 may include a horizontal start signal and a load signal.

The driving controller 200 may generate the output image data DATA based on the input image data IMG. The driving controller 200 may output the output image data DATA to the data driver 500.

The driving controller 200 may generate the third control signal CONT3 for controlling an operation of the gamma reference voltage generator 400 based on the input control signal CONT, and may output the third control signal CONT3 to the gamma reference voltage generator 400.

In one or more embodiments, The driving controller 200 may generate the fourth control signal CONT4 for controlling an operation of the emission driver 600 based on the input control signal CONT, and may output the fourth control signal CONT4 to the emission driver 600.

In one or more embodiments, The driving controller 200 may generate the fifth control signal CONT5 for controlling an operation of the voltage generator 700 based on the input control signal CONT, and may output the fifth control signal CONT5 to the voltage generator 700.

The gate driver 300 may generate gate signals driving the gate lines GL in response to the first control signal CONT1 received from the driving controller 200. The gate driver 300 may output the gate signals to the gate lines GL. In one or more embodiments, the gate signals may include a writing gate signal, a compensation gate signal, initialization gate signal, and bias gate signal.

In one or more embodiments, the gate driver 300 may be integrated on the peripheral region of the display panel 100. In one or more embodiments, the gate driver 300 may be mounted on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to a level of the output image data DATA.

In one or more embodiments, the gamma reference voltage generator 400 may be located in the driving controller 200, or in the data driver 500.

The data driver 500 may receive the second control signal CONT2 and the output image data DATA from the driving controller 200, and may receive the gamma reference voltages VGREF from the gamma reference voltage generator 400. The data driver 500 converts the output image data DATA into data voltages VDATA having an analog type using the gamma reference voltages VGREF. The data driver 500 may output the data voltages to the data lines DL.

In one or more embodiments, the data driver 500 may be integrated on the peripheral region of the display panel 100. In one or more embodiments, the data driver 500 may be mounted on the peripheral region of the display panel 100.

The emission driver 600 may generate emission signals in response to the fourth control signal CONT4 received from the driving controller 200. The emission driver 600 may output the emission signals to the emission lines EL.

In one or more embodiments, the emission driver 600 may be integrated on the peripheral region of the display panel 100. In one or more embodiments, the emission driver 600 may be mounted on the peripheral region of the display panel 100.

Although the gate driver 300 is located at a first side of the display panel 100 and the emission driver 600 is located at a second side of the display panel 100 opposite to the first side in FIG. 1 for convenience of explanation, the present disclosure may not be limited thereto. For example, both of the gate driver 300 and the emission driver 600 may be located at the first side of the display panel 100. For example, the gate driver 300 and the emission driver 600 may be integrally formed.

In one or more embodiments, the voltage generator 700 may generate a first power supply voltage ELVDD and a second power supply voltage ELVSS in response to the fifth control signal CONT5 received from the driving controller 200. The voltage generator 700 may output the first power supply voltage ELVDD and the second power supply voltage ELVSS to the display panel.

FIG. 2 is a diagram illustrating an example of a plurality of lifetime data of a plurality of blocks that divide a display panel 100 of FIG. 1;

Referring to FIGS. 1 and 2, the driving controller 200 may divide the display panel 100 into a plurality of blocks, each block including at least one pixel PX. For example, the display panel 100 may be divided into i×j blocks (i rows, j columns). For example, the display panel may be divided into 100 blocks (100 rows, 100 columns).

The driving controller 200 may calculate a plurality of accumulated degradation data corresponding to the plurality of blocks based on the output image data IMG corresponding to the plurality of blocks. The a plurality of accumulated degradation data may be a accumulated degradation amount of the at least one pixel PX in the plurality of block. For example, the degradation amount may be a value that considers the temperature of the display panel 100, operating time, etc.

The driving controller 200 may calculate a plurality of lifetime data corresponding to remaining lifetimes of the plurality of blocks based on the plurality of the accumulated degradation data. For example, the remaining lifetimes may be a maximum lifetime (%) minus the accumulated degradation data. For example, the maximum lifetime of a block located in row 5, column 2 may be 100%, and the accumulated degradation data may be 5%. Accordingly, one of the plurality of lifetime data of the block located in row 5, column 2 may be 95% from the maximum lifetime minus the accumulated degradation data. For example, the maximum lifetime of a block located in row 3, column 8 may be 100%, and the accumulated degradation data may be 7%. Accordingly, the lifetime data of the block located in row 5, column 2 may be 93% from the maximum lifetime minus the accumulated degradation data.

FIG. 3A is a diagram illustrating an example of difference values of a plurality of lifetime data of horizontally adjacent blocks of the plurality of blocks having the plurality of lifetime data of FIG. 2. FIG. 3B is a diagram illustrating an example of vertical afterimage boundaries based on the difference values of FIG. 3A.

Referring to FIGS. 1 to 3B, the driving controller 200 may calculate a difference value between one of the plurality of lifetime data for a first block of the plurality of blocks and one of the plurality of lifetime data for a second block horizontally adjacent to the first block of the plurality of blocks. In addition, when the difference value between one of the plurality of lifetime data for the first block and one of the plurality of lifetime data for the second block is greater than or equal to a threshold value, the driving controller 200 may determine a boundary between the first block and the second block as a vertical afterimage boundary.

For example, the first block may be a block located in row 5, column 1, and the second block horizontally adjacent to the first block may be a block located in row 5, column 2. One of the plurality of lifetime data for the first block may be 100%, and one of the plurality of lifetime data for the second block may be 95%. The difference value between one of the plurality of lifetime data for the first block and one of the plurality of lifetime data for the second block may be 5%. When the threshold value is 4%, the difference value is greater than the threshold value. Accordingly, the driving controller 200 may determine the boundary between the first block and the second block as the vertical afterimage boundary.

For example, the first block may be a block located in row 4, column 9, and the second block horizontally adjacent to the first block may be a block located in row 4, column 8. One of the plurality of lifetime data for the first block may be 100%, and one of the plurality of lifetime data for the second block may be 93%. The difference value between one of the plurality of lifetime data for the first block and one of the plurality of lifetime data for the second block may be 7%. When the threshold value is 4%, the difference value is greater than the threshold value. Accordingly, the driving controller 200 may determine the boundary between the first block and the second block as the vertical afterimage boundary.

FIG. 4A is a diagram illustrating an example of difference values of a plurality of lifetime data of vertically adjacent blocks of the plurality of blocks having the plurality of lifetime data of FIG. 2. FIG. 4B is a diagram illustrating an example of horizontal afterimage boundaries based on the difference values of FIG. 3A;

Referring to FIGS. 1, 2, 4A, and 4B, the driving controller 200 may calculate a difference value between one of the plurality of lifetime data for the first block of the plurality of blocks and one of the plurality of lifetime data for a second block vertically adjacent to the first block of the plurality of blocks. In addition, when the difference value between one of the plurality of lifetime data for the first block and one of the plurality of lifetime data for the second block is greater than or equal to a threshold value, the driving controller 200 may determine a boundary between the first block and the second block as a horizontal afterimage boundary.

For example, the first block may be a block located in row 3, column 5, and the second block vertically adjacent to the first block may be a block located in row 4, column 5. One of the plurality of lifetime data for the first block may be 99%, and one of the plurality of lifetime data for the second block may be 95%. The difference value between one of the plurality of lifetime data for the first block and one of the plurality of lifetime data for the second block may be 4%. When the threshold value is 4%, the difference value is equal to the threshold value. Accordingly, the driving controller 200 may determine the boundary between the first block and the second block as the horizontal afterimage boundary.

For example, the first block may be a block located in row 6, column 8, and the second block vertically adjacent to the first block may be a block located in row 5, column 8. One of the plurality of lifetime data for the first block may be 98%, and one of the plurality of lifetime data for the second block may be 93%. The difference value between one of the plurality of lifetime data for the first block and one of the plurality of lifetime data for the second block may be 5%. When the threshold value is 4%, the difference value is greater than the threshold value. Accordingly, the driving controller 200 may determine the boundary between the first block and the second block as the horizontal afterimage boundary.

FIG. 5 is a diagram illustrating an example of afterimage boundaries according to one or more embodiments;

Referring to FIGS. 1, 2, and 5, the driving controller 200 may calculate the difference value between one of the plurality of lifetime data for the first block of the plurality of blocks and one of the plurality of lifetime data for the second block horizontally adjacent to the first block of the plurality of blocks. In addition, the driving controller 200 may calculate a difference value between one of the plurality of lifetime data for the first block of the plurality of blocks and one of the plurality of lifetime data for the second block vertically adjacent to the first block of the plurality of blocks. When the difference value between one of the plurality of lifetime data for the first block and one of the plurality of lifetime data for the second block is greater than or equal to a threshold value, the driving controller 200 may determine a boundary between the first block and the second block as a afterimage boundary.

For example, the first block may be a block located in row 6, column 3, and the second block horizontally adjacent to the first block may be a block located in row 6, column 2. A third block vertically adjacent to the first block may be a block located in row 5, column 3. One of the plurality of lifetime data for the first block may be 100%, one of the plurality of lifetime data for the second block may be 95%, and one of the plurality of lifetime data for the third block may be 94%. The difference value between one of the plurality of lifetime data for the first block and one of the plurality of lifetime data for the second block may be 5%, and the difference value between one of the plurality of lifetime data for the first block and one of the plurality of lifetime data for the third block may be 6%. When the threshold value is 4%, the difference value between one of the plurality of lifetime data for the first block and one of the plurality of lifetime data for the second block is greater than the threshold value. The driving controller 200 may determine the boundary between the first block and the second block as the afterimage boundary. In addition, When the threshold value is 4%, the difference value between one of the plurality of lifetime data for the first block and one of the plurality of lifetime data for the third block is greater than the threshold value. The driving controller 200 may determine the boundary between the first block and the third block as the afterimage boundary.

For example, the first block may be a block located in row 5, column 4, and the second block horizontally adjacent to the first block may be a block located in row 5, column 3. One of the plurality of lifetime data for the first block may be 98%, and one of the plurality of lifetime data for the second block may be 94%. The difference value between one of the plurality of lifetime data for the first block and one of the plurality of lifetime data for the second block may be 4%. When the threshold value is 4%, the difference value is equal to the threshold value. Accordingly, the driving controller 200 may determine the boundary between the first block and the second block as the vertical afterimage boundary.

For example, the first block may be a block located in row 6, column 8, and the second block vertically adjacent to the first block may be a block located in row 5, column 8. One of the plurality of lifetime data for the first block may be 98%, and one of the plurality of lifetime data for the second block may be 93%. The difference value between one of the plurality of lifetime data for the first block and one of the plurality of lifetime data for the second block may be 5%. When the threshold value is 4%, the difference value is greater than the threshold value. Accordingly, the driving controller 200 may determine the boundary between the first block and the second block as the horizontal afterimage boundary.

Figure 6:
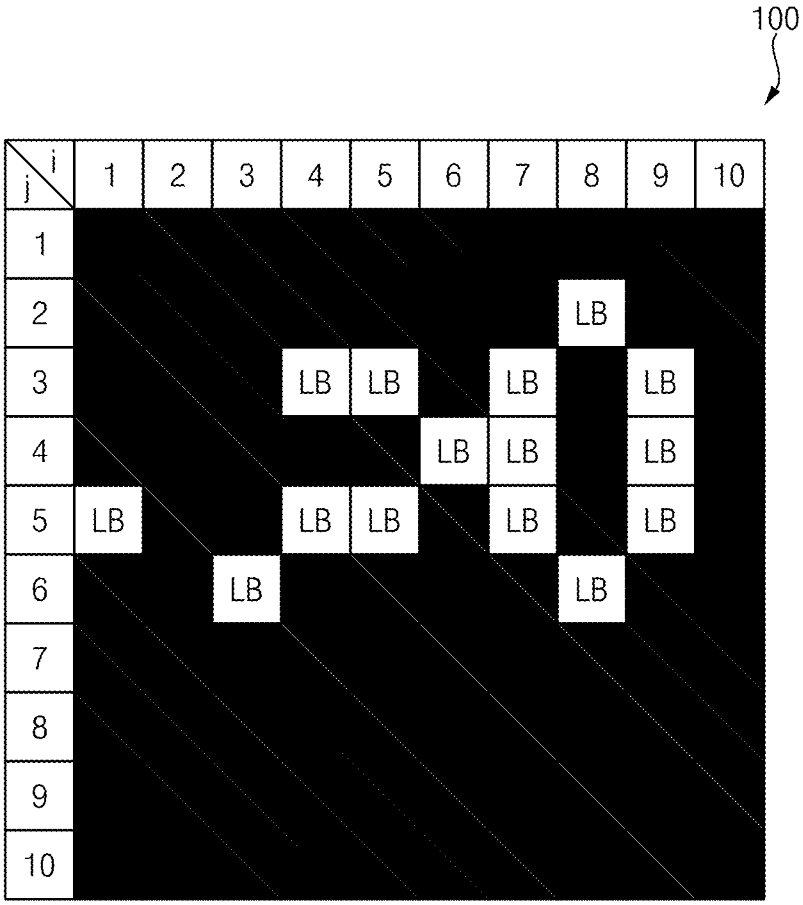
FIG. 6 is a diagram illustrating an example of long lifetime blocks of the plurality of blocks that divide a display panel of FIG. 1.

FIG. 6 is a diagram illustrating an example of long lifetime blocks LB of the plurality of blocks that divide a display panel of FIG. 1;

Referring to FIGS. 1, 2, and 6, the driving controller 200 may calculate the difference value between one of the plurality of lifetime data for the first block of the plurality of blocks and one of the plurality of lifetime data for the second block adjacent to the first block of the plurality of blocks. The driving controller 200 may compare the difference value between one of the plurality of lifetime data for the first block of the plurality of blocks and one of the plurality of lifetime data for a second block of the plurality of blocks with a threshold value. When the difference value is greater than or equal to the threshold value, the driving controller 200 may determine a block having larger lifetime data among the first block and the second block as a long lifetime block LB.

For example, the first block may be the block located in row 6, column 8, and the second block adjacent to the first block may be the block located in row 5, column 8. One of the plurality of lifetime data for the first block may be 98%, and one of the plurality of lifetime data for the second block may be 93%. The difference value between one of the plurality of lifetime data for the first block and one of the plurality of lifetime data for the second block may be 5%. The threshold value may be 4%. The difference value between one of the plurality of lifetime data for the first block and one of the plurality of lifetime data for the second block may be greater than the threshold value. One of the plurality of lifetime data for the first block may be greater than one of the plurality of lifetime data for the second block. Accordingly, the driving controller 200 may determine the first block as the long lifetime block LB. That is, the driving controller 200 may determine the block located in row 6, column 8 as the long lifetime block LB.

For example, the first block may be the block located in row 5, column 4, and the second block adjacent to the first block may be the block located in row 5, column 3. One of the plurality of lifetime data for the first block may be 98%, and one of the plurality of lifetime data for the second block may be 94%. The difference value between one of the plurality of lifetime data for the first block and one of the plurality of lifetime data for the second block may be 4%. The threshold value may be 4%. The difference value between one of the plurality of lifetime data for the first block and one of the plurality of lifetime data for the second block may be equal to the threshold value. One of the plurality of lifetime data for the first block may be greater than one of the plurality of lifetime data for the second block. Accordingly, the driving controller 200 may determine the first block as the long lifetime block LB. That is, the driving controller 200 may determine the block located in row 5, column 4 as the long lifetime block LB.

Figure 7A:
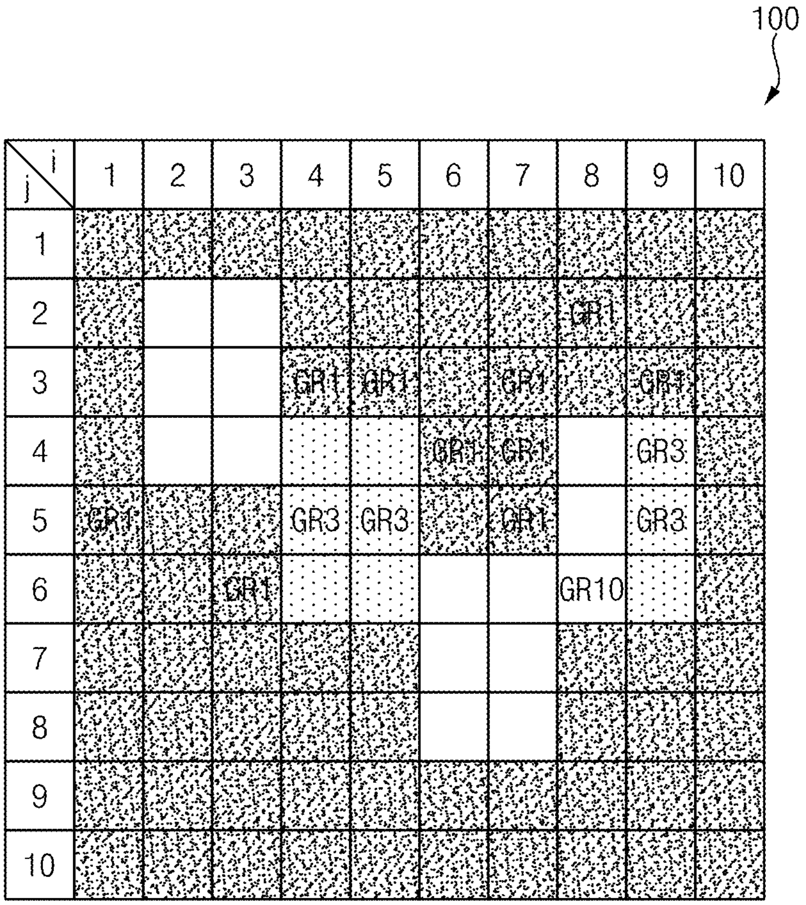
FIG. 7A is a diagram illustrating an example of a gray level for the long lifetime blocks of FIG. 6.
Figure 8A:
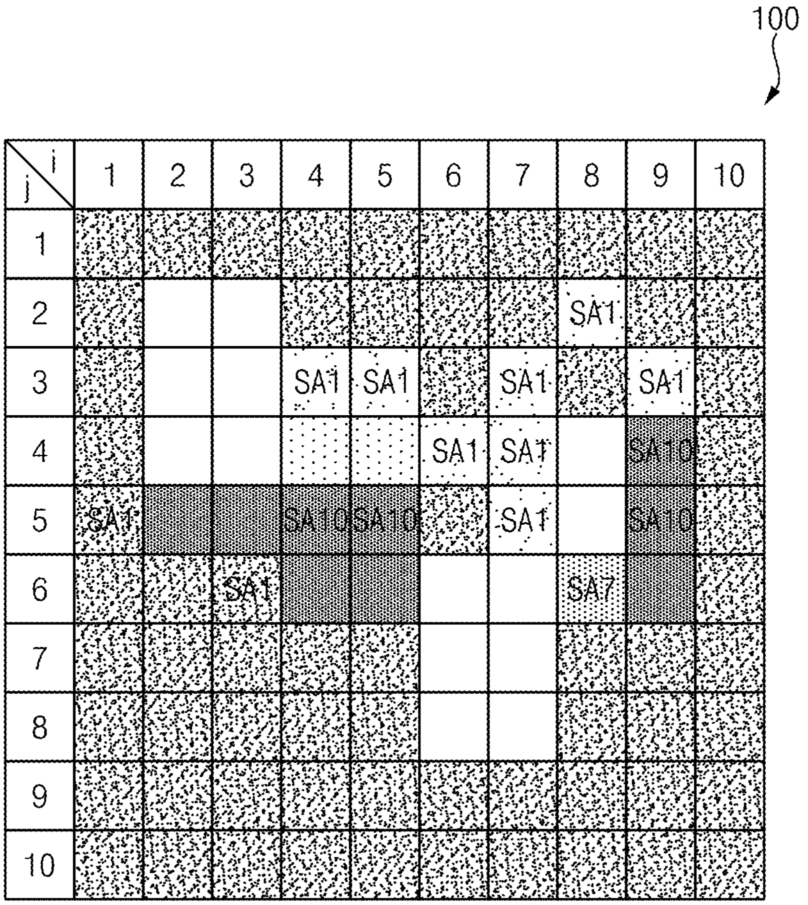
FIG. 8A is a diagram illustrating an example of a saturation level for the long lifetime blocks of FIG. 6.

FIG. 7A is a diagram illustrating an example of a gray level for the long lifetime blocks LB of FIG. 6. FIG. 7B is a diagram illustrating an example of first gain values determined according to the gray level of FIG. 7A for the long lifetime blocks LB. FIG. 8A is a diagram illustrating an example of a saturation level for the long lifetime blocks LB of FIG. 6. FIG. 8B is a diagram illustrating an example of second gain values determined according to the saturation level of FIG. 8A for the long lifetime blocks LB.

Referring to FIGS. 1, 2, and 6 to 8B, the driving controller 200 may generate forced degradation data to degrade the long lifetime block LB. The forced degradation data may include data to degrade the long lifetime block LB.

The forced degradation data may include a plurality of gain values applied to the input image data IMG corresponding to the long lifetime block LB. The plurality of gain values may include a first gain value determined according to the gray level of the input image data IMG corresponding to the long lifetime block LB. In addition, the plurality of gain values may include a second gain value determined according to the saturation level of the input image data IMG corresponding to the long lifetime block LB.

The first gain value may increase when the gray level of the input image data corresponding to the long lifetime block LB decreases. The second gain value may increase when the saturation level of the input image data corresponding to the long lifetime block LB increases.

For example, the gray level of the input image data IMG corresponding to the long lifetime block LB may have a first gray level GR1 to a tenth gray level GR10. The first gray level GR1 may be a lowest gray level. The tenth gray level GR10 may be a highest gray level.

A block located in row 5, column 1 may be the long lifetime block LB. The gray level of the input image data IMG corresponding to the block located in row 5, column 1 may have the first gray level GR1. Accordingly, the first gain value of the block located in row 5, column 1 may be 1.1.

In addition, A block located in row 4, column 9 may be the long lifetime block LB. The gray level of the input image data IMG corresponding to the block located in row 4, column 9 may have the third gray level GR3. Accordingly, the first gain value of the block located in row 4, column 9 may be 1.08.

In addition, A block located in row 6, column 8 may be the long lifetime block LB. The gray level of the input image data IMG corresponding to the block located in row 6, column 8 may have the tenth gray level GR10. Accordingly, the first gain value of the block located in row 6, column 8 may be 1.01.

For example, the saturation level of the input image data IMG corresponding to the long lifetime block LB may have a first saturation level SA1 to a tenth saturation level SA10. The first saturation level SA1 may be a lowest gray level. The tenth saturation level SA10 may be a highest gray level.

A block located in row 5, column 1 may be the long lifetime block LB. The saturation level of the input image data IMG corresponding to the block located in row 5, column 1 may have the first saturation level SA1. Accordingly, the second gain value of the block located in row 5, column 1 may be 1.01.

In addition, a block located in row 4, column 9 may be the long lifetime block LB. The saturation level of the input image data IMG corresponding to the block located in row 4, column 9 may have the tenth saturation level SA10. Accordingly, the second gain value of the block located in row 4, column 9 may be 1.1.

In addition, A block located in row 6, column 8 may be the long lifetime block LB. The saturation level of the input image data IMG corresponding to the block located in row 6, column 8 may have the seventh saturation level SA7. Accordingly, the second gain value of the block located in row 6, column 8 may be 1.07.

The driving controller 200 may generate the output image data DATA by applying the forced degradation data to the input image data IMG. For example, the driving controller 200 may generate the output image data DATA by multiplying the input image data IMG by the forced degradation data.

For example, the block located in row 5, column 1 may be the long lifetime block LB. The first gain value may be 1.1 corresponding to the block located in row 5, column 1. The second gain value may be 1.01 corresponding to the block located in row 5, column 1. The driving controller 200 may generate the output image data DATA by multiplying the input image data IMG corresponding to the block located in row 5, column 1 by 1.111. At this time, 1.111 may be a value obtained by multiplying the first gain value (1.1) by the second gain value (1.01).

For example, the block located in row 4, column 9 may be the long lifetime block LB. The first gain value may be 1.08 corresponding to the block located in row 4, column 9. The second gain value may be 1.1 corresponding to the block located in row 4, column 9. The driving controller 200 may generate the output image data DATA by multiplying the input image data IMG corresponding to the block located in row 4, column 9 by 1.188. At this time, 1.188 may be a value obtained by multiplying the first gain value (1.08) by the second gain value (1.1).

When the driving controller 200 degrade the long lifetime block LB by applying the forced degradation data including the plurality of gain values to the input image data IMG, the difference value between the plurality of lifetime data of the plurality of blocks may be decreased. Accordingly, the time at which the user of the display device 800 recognizes the afterimage may be delayed.

Figure 9A:
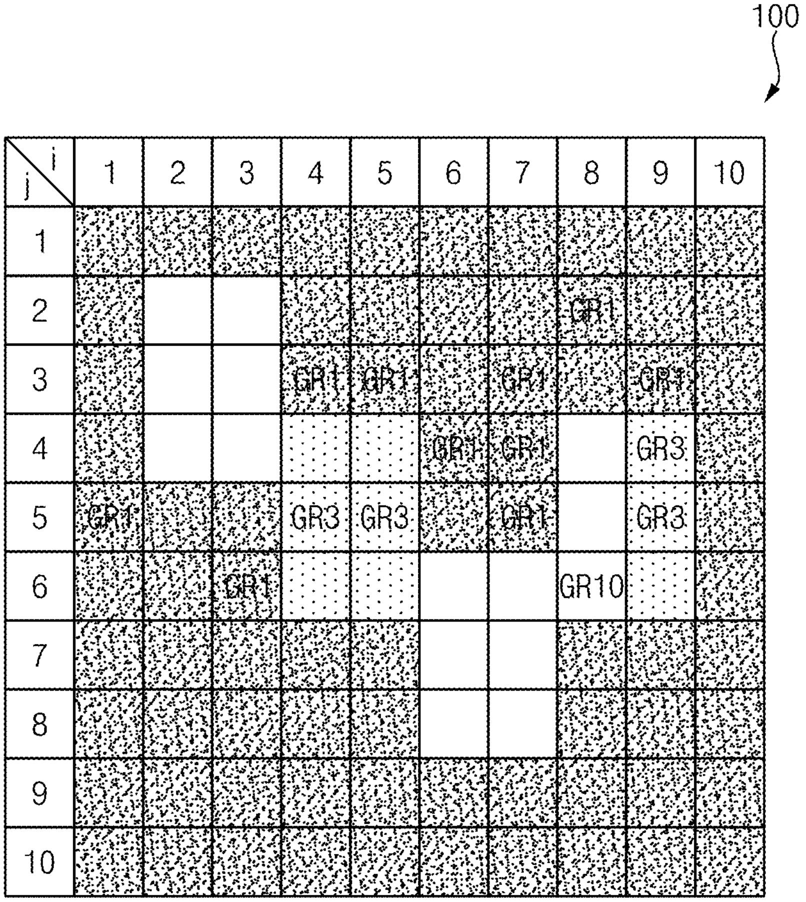
FIG. 9A is a diagram illustrating another example of a gray level for the long lifetime blocks of FIG. 6.
Figure 9B:
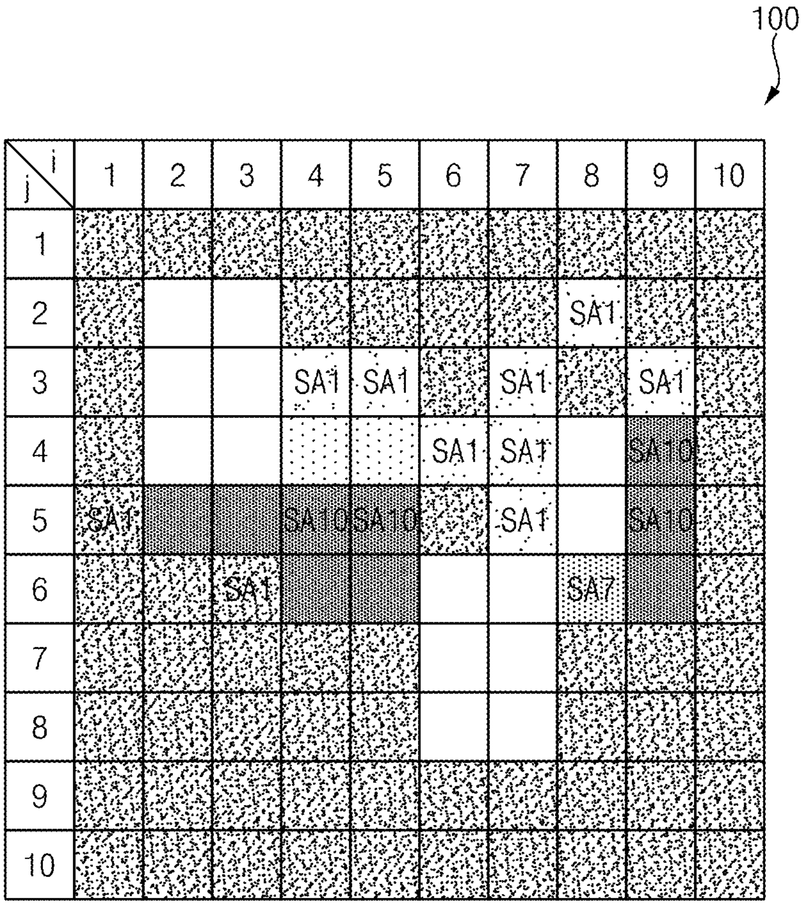
FIG. 9B is a diagram illustrating another example of a saturation level for the long lifetime blocks of FIG. 6.

FIG. 9A is a diagram illustrating another example of a gray level for the long lifetime blocks LB of FIG. 6. FIG. 9B is a diagram illustrating another example of a saturation level for the long lifetime blocks LB of FIG. 6. FIG. 9C is a diagram illustrating an example of forced degradation data according to one or more embodiments.

Referring to FIGS. 1, 2, 6, and 9A to 9C, the driving controller 200 may generate the forced degradation data to degrade the long lifetime block LB.

The forced degradation data may include the gain value applied the input image data IMG corresponding to the long lifetime block LB.

The driving controller 200 may generate the output image data DATA by applying the forced degradation data to the input image data IMG. For example, the driving controller 200 may generate the output image data DATA by multiplying the input image data IMG by the forced degradation data.

In addition, the driving controller 200 may receive an attention signal TIMG for determining whether the user of the display device 800 is attentive. When an attention of the user is detected, the driving controller 200 may receive the attention signal TIMG having the first level. When an attention of the user is not detected, the driving controller 200 may receive the attention signal TIMG having the second level.

When the driving controller 200 receives the attention signal TIMG having the second level, the gain value may have a maximum value regardless of the gray level or the saturation level of the input image data corresponding to the long lifetime block LB. For example, when the block located in row 5, column 1 is the long lifetime block LB and the gray level of the long lifetime block LB has the first gray level GR1 and the saturation level of the long lifetime block LB has the first saturation level SA1, the maximum value of the gain value may be 1.1. For example, when the block located in row 6, column 8 is the long lifetime block LB and the gray level of the long lifetime block LB has the tenth gray level GR10 and the saturation level of the long lifetime block LB has the seventh saturation level SA7, the maximum value of the gain value may be 1.1.

Accordingly, the driving controller 200 may generate the output image data DATA by multiplying the input image data IMG by the force degradation data including the gain value. At this time, the gain value may have the maximum value (1.1).

When the driving controller 200 receives the attention signal TIMG having the second level, the user may not recognize the brightness, etc. Accordingly, when the driving controller 200 degrades the long lifetime block LB by applying the forced degradation data including the gain value having the maximum value to the input image data IMG, the difference value between the plurality of lifetime data of the plurality of blocks may be decreased.

When the driving controller 200 degrades the long lifetime block LB by applying the forced degradation data including the gain value to the input image data IMG, the difference value between the plurality of lifetime data of the plurality of blocks may be decreased. Accordingly, the time at which the user of the display device 800 recognizes the afterimage may be delayed.

Figure 10:
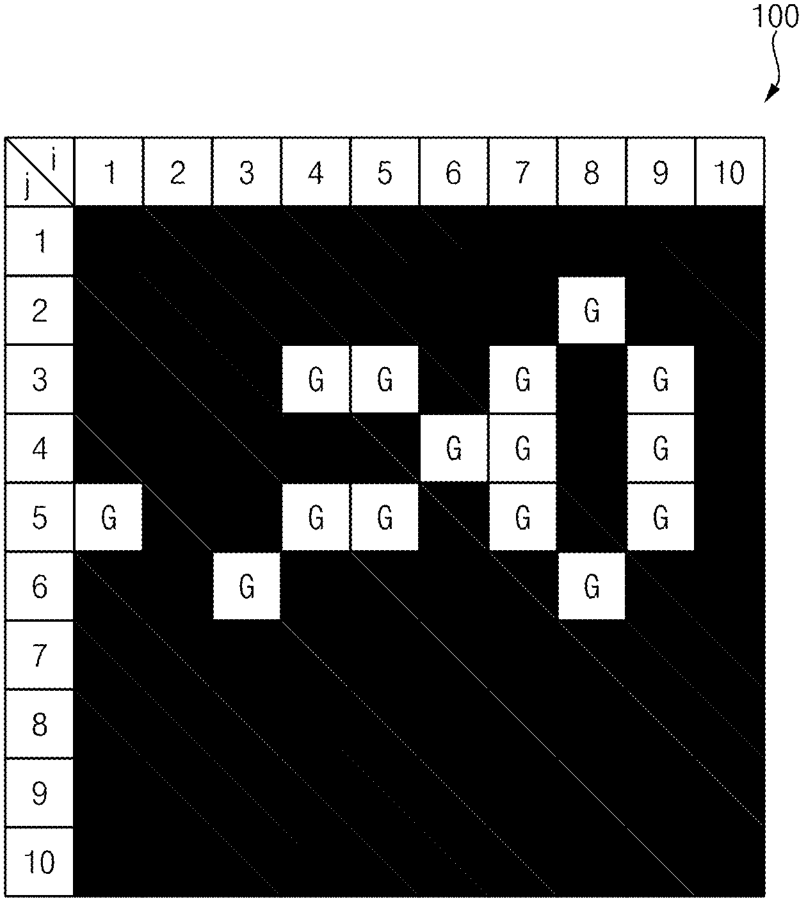
FIG. 10 is a diagram illustrating another example of forced degradation data according to one or more embodiments.

FIG. 10 is a diagram illustrating another example of forced degradation data according to one or more embodiments;

Referring to FIGS. 1, 2, 6, and 10, the driving controller 200 may generate the forced degradation data to degrade the long lifetime block LB.

The forced degradation data may include the gray level value G for emitting light at a corresponding brightness for the at least one pixel included in the long lifetime block LB. For example, the corresponding brightness may be a maximum brightness of the at least one pixel.

The driving controller 200 may receive the attention signal TIMG for determining whether a user of the display device 800 is attentive. When the attention of the user is detected, the driving controller 200 may receive the attention signal TIMG having the first level. When the attention of the user is not detected, the driving controller 200 may receive the attention signal TIMG having the second level. For example, when a front part of the display panel 100 is covered by a cover, the driving controller 200 may receive the attention signal TIMG having the second level. For example, a laptop computer is covered, the driving controller 200 may receive the attention signal TIMG having the second level.

When the driving controller 200 receives the attention signal TIMG having the second level, and does not receive the input image data IMG, the driving controller 200 may generate the forced degradation data as the output image data DATA.

When the driving controller 200 receives the attention signal TIMG having the second level, and does not receive the input image data IMG, the user may not recognize the brightness, etc. Accordingly, when the driving controller 200 generates the forced degradation data including the gray level value G for emitting light at the corresponding brightness for the at least one pixel included in the long lifetime block LB as the output image data DATA and degrades the long lifetime block LB, the difference value between the plurality of lifetime data of the plurality of blocks may be decreased.

When the driving controller 200 degrades the long lifetime block LB by applying the forced degradation data including the gray level value G to the input image data IMG, the driving controller 200 may decrease the difference value between the plurality of lifetime data of the plurality of blocks.

Figure 11A:
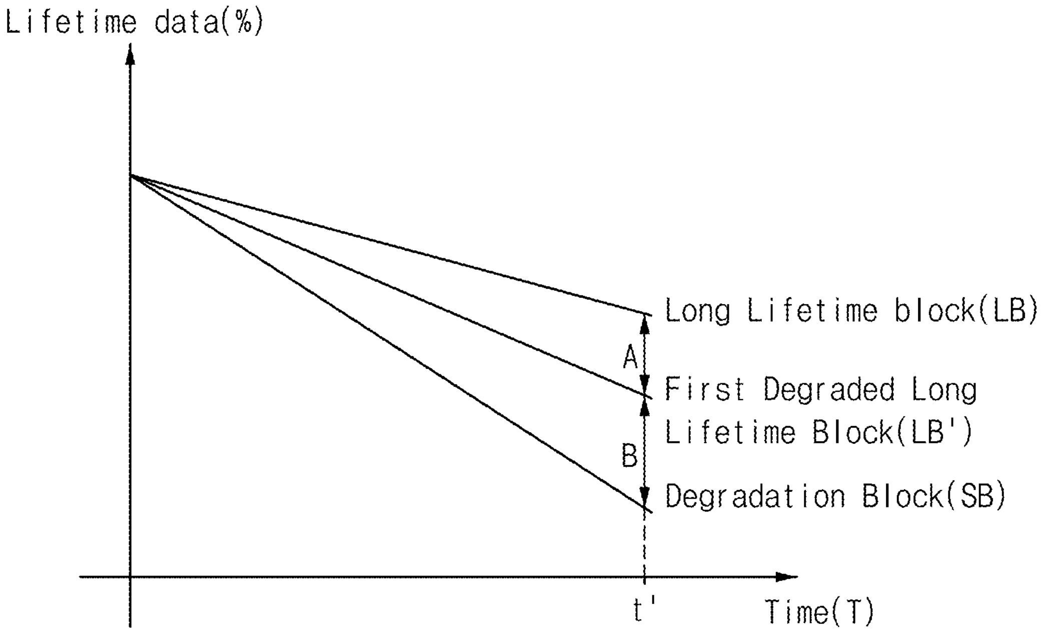
FIG. 11A is a graph illustrating a remaining lifetime of the long lifetime blocks according to conventional afterimage compensation method.
Figure 11B:
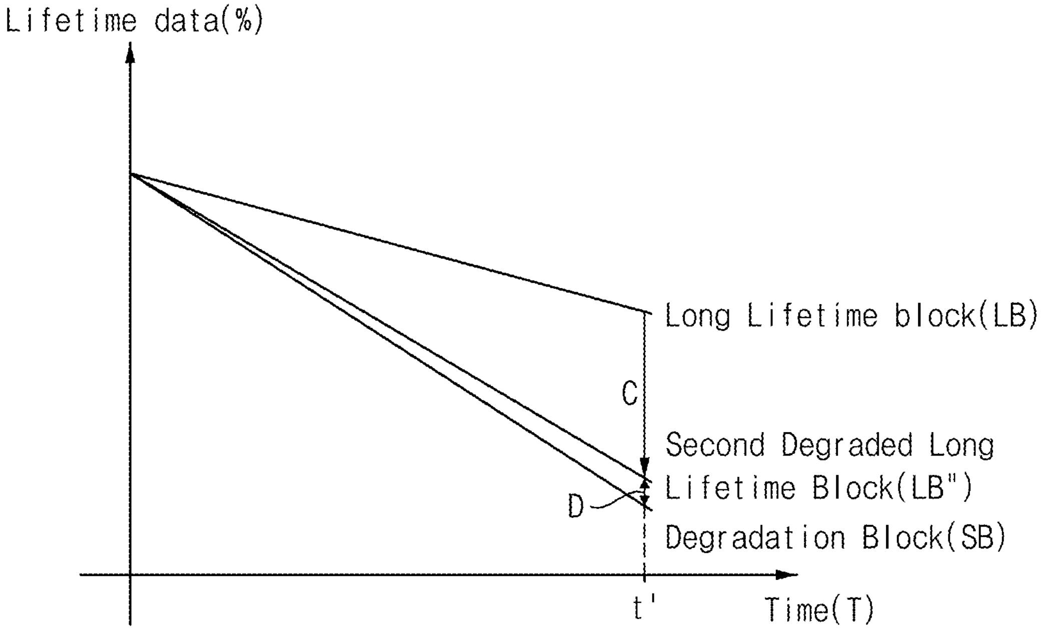
FIG. 11B is a graph illustrating a remaining lifetime of the long lifetime blocks according to one or more embodiments.

FIG. 11A is a graph illustrating a remaining lifetime of the long lifetime blocks LB according to conventional afterimage compensation method. FIG. 11B is a graph illustrating a remaining lifetime of the long lifetime blocks LB according to one or more embodiments;

Referring to FIGS. 11A and 11B, a degradation block SB may be a block of the plurality of blocks except the long lifetime block LB. A maximum lifetime data of the degradation block SB may be the same as the maximum lifetime data of the long lifetime block LB. The lifetime data of the long lifetime block LB and the lifetime data of the degradation block SB may decrease over time T. A difference value between the lifetime data of the long lifetime block LB and the lifetime data of the degradation block SB may increase. For example, the difference value between the lifetime data of the long lifetime block LB and the lifetime data of the degradation block SB may be A+B. The driving controller 200 may degrade the long lifetime block LB to decrease the difference value between the lifetime data of the long lifetime block LB and the lifetime data of the degradation block SB.

A driving controller according to a conventional degradation method may decrease the lifetime data of the long lifetime block LB by the amount A. Accordingly, the lifetime data of the degraded lifetime block LB may be the same as the lifetime data of a first degraded lifetime block LB'. A difference value between the lifetime data of the first degraded lifetime data LB' and the lifetime data of the degraded block SB may be decreased to the amount B.

In one or more embodiments of the present disclosure, the driving controller 200 may decrease the lifetime data of the long lifetime block LB by an amount C. Accordingly, the lifetime data of the degraded lifetime block LB may be the same as the lifetime data of a second degraded lifetime block LB". A difference value between the lifetime data of the second degraded lifetime data LB" and the lifetime data of the degraded block SB may be decreased to the amount D.

The amount D may be less than the amount B. Accordingly, when the lifetime data of the long lifetime block LB is degraded to be equal to the lifetime data of the second degraded long lifetime block LB", the time at which a user of the display device 800 recognizes the afterimage may be delayed compared to the conventional degradation method.

Figure 12:
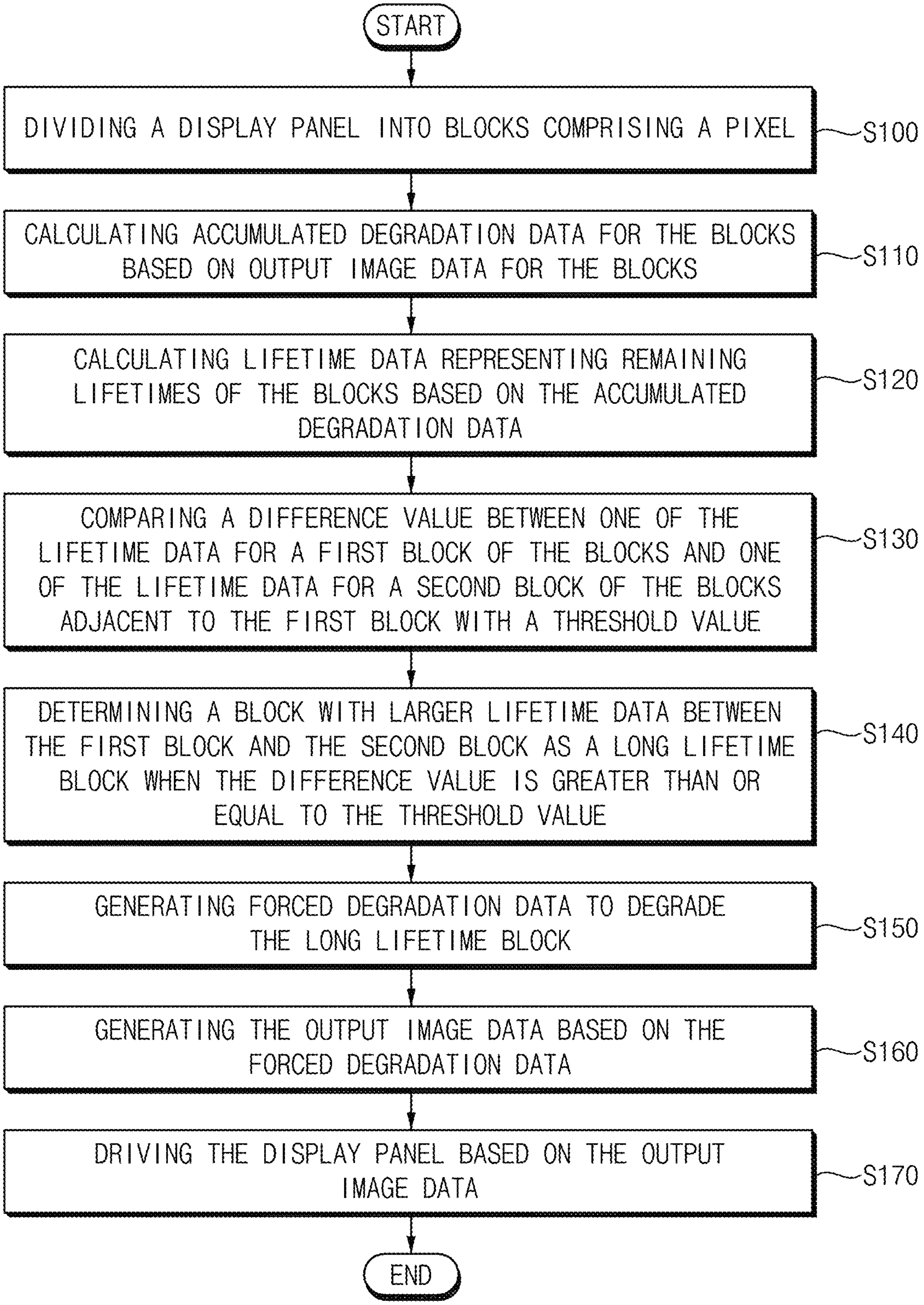
FIG. 12 is a flowchart diagram illustrating a method of operating the display device according to one or more embodiments.

FIG. 12 is a flowchart diagram illustrating a method of operating the display device 800 according to one or more embodiments.

Referring to FIGS. 1, 2, 6 to 10, and 12, the method of operating the display device 800 may include dividing the display panel 100 into the plurality of blocks, each block including the at least one pixel (S100).

The method of operating the display device 800 may further include calculating the plurality of accumulated degradation data corresponding to the plurality of blocks (S110).

The method of operating the display device 800 may further include calculating the plurality of lifetime data corresponding to remaining lifetimes of the plurality of blocks based on the plurality of the accumulated degradation data (S120).

The method of operating the display device 800 may further include comparing the difference value between the plurality of lifetime data of a first block for the plurality of blocks and one of the plurality of lifetime data for a second block adjacent to the first block of the plurality of blocks with a threshold value (S130).

The method of operating the display device 800 may further include determining the block with larger lifetime data between the first block and the second block as a long lifetime block LB when the difference value is greater than or equal to the threshold value (S140).

The method of operating the display device 800 may further include generating the forced degradation data to degrade the long lifetime block LB (S150).

The method of operating the display device 800 may further include generating the output image data DATA by applying the forced degradation data to the input image data IMG (S160). For example, the driving controller 200 may apply the forced degradation data to input image data IMG. For example, the driving controller 200 may generate the forced degradation date as the output image data DATA.

The method of operating the display device 800 may further include driving the display panel 100 based on the output image data DATA (S170).

The method of operating the display device 800 may be performed by the driving controller 200 included in the display device 800.

The driving controller 200 may degrade the long lifetime block LB by generating the output image data DATA using the forced degradation data. The difference value between the plurality of lifetime data of the plurality of blocks may be decreased. Accordingly, the time at which the user of the display device 800 recognizes the afterimage may be delayed.

Figure 13:
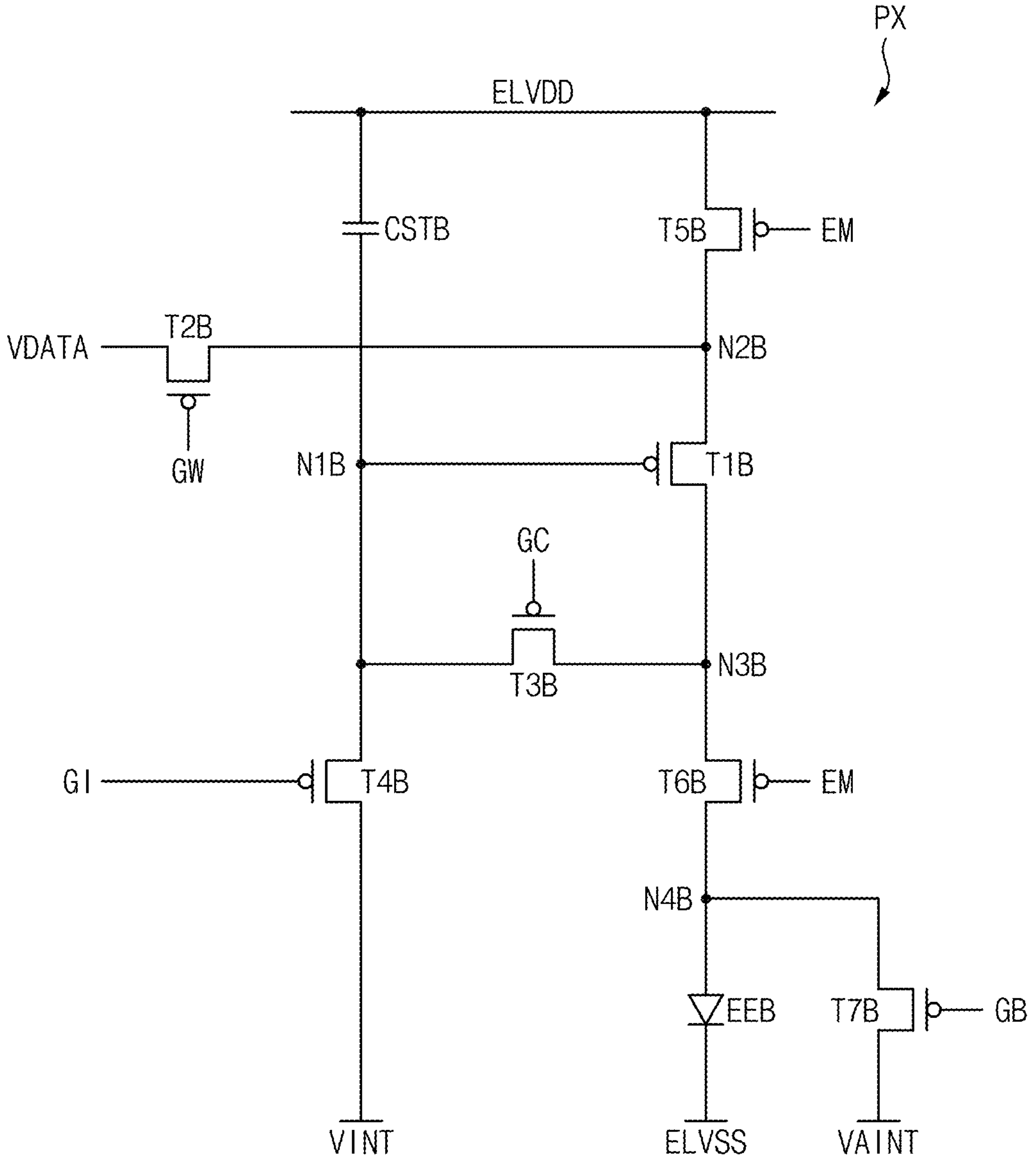
FIG. 13 is a circuit diagram illustrating a pixel of FIG. 1 according to one or more embodiments.

FIG. 13 is a circuit diagram illustrating a pixel PX of FIG. 1 according to one or more embodiments.

Referring to FIG. 13, the pixel PX may include a first transistor T1B, a second transistor T2B, a third transistor T3B, a fourth transistor T4B, a fifth transistor T5B, a sixth transistor T6B, a seventh transistor T7B, a storage capacitor CSTB, and a light-emitting element EEB.

The first transistor T1B may include a control electrode connected to a first node N1B, a first electrode connected to a second node N2B, and a second electrode connected to a third node N3B. The first transistor T1B may generate the driving current based on a voltage of the first node N1B. For example, the first transistor T1B may be referred to as a driving transistor.

The second transistor T2B may include a control electrode for receiving the writing gate signal GW, a first electrode for receiving the data voltage VDATA, and second electrode connected to the second node N2B. The second transistor T2B may transmit the data voltage VDATA to the second node N2B in response to the writing gate signal GW. For example, the second transistor T2B may referred to as a writing transistor.

The third transistor T3B may include a control electrode for receiving the compensation gate signal GC, a first electrode connected to the third node N3B, and a second electrode connected to the first node N1B. The third transistor T3B may connect the first node N1B and the third node N3B in response to the compensation gate signal GC. For example, the third transistor T3B may diode connect the first transistor T1B in response to the compensation gate signal GC. For example, the third transistor T3B may referred to as a compensation transistor.

The fourth transistor T4B may include a control electrode for receiving the initialization gate signal GI, a first electrode for receiving a initialization voltage VINT, and a second electrode connected to the first node N1B. The fourth transistor T4B may transmit the initialization voltage VINT to the first node N1B in response to the initialization gate signal GI. For example, the fourth transistor may be referred to as a initialization transistor.

The fifth transistor T5B may include a control electrode for receiving the emission signal EM, a first electrode for receiving the first power supply voltage ELVDD, and a second electrode connected to the second node N2B. The fifth transistor T5B may transmit the first power supply voltage ELVDD to the second node N2B in response to the emission signal EM. For example, the fifth transistor T5B may referred to a second emitting transistor.

The sixth transistor T6B may include a control electrode for receiving the emission signal EM, a first electrode connected to the third node N3B, and a second electrode connected to a fourth node N4B. The sixth transistor T6B may connect the third node N3B and the fourth node N4B in response to the emission signal EM. For example, the sixth transistor T6B may referred to as a first emitting transistor.

The seventh transistor T7B may include a control electrode for receiving the bias gate signal GB, a first electrode for receiving a light-emitting element initialization voltage VAINT, and a second electrode connected to the fourth node N4B. The seventh transistor T7B may transmit the light-emitting element initialization voltage VAINT to the fourth node N4B. For example, the light-emitting element initialization voltage VAINT may be lower than the second power supply voltage ELVSS. When the light-emitting element initialization voltage VAINT is applied to the fourth node N4B, a black characteristic of the pixel PX may be improved.

The storage capacitor CSTB may include a first electrode for receiving the first power supply voltage ELVDD, and a second electrode connected to the first node N1B. The storage capacitor CSTB may store the voltage of the first node N1B.

The light-emitting element EEB may include a first electrode connected to the fourth node N4B, and a second electrode for receiving the second power supply voltage ELVSS. The light-emitting element EEB may emit light based on the driving current.

Figure 14:
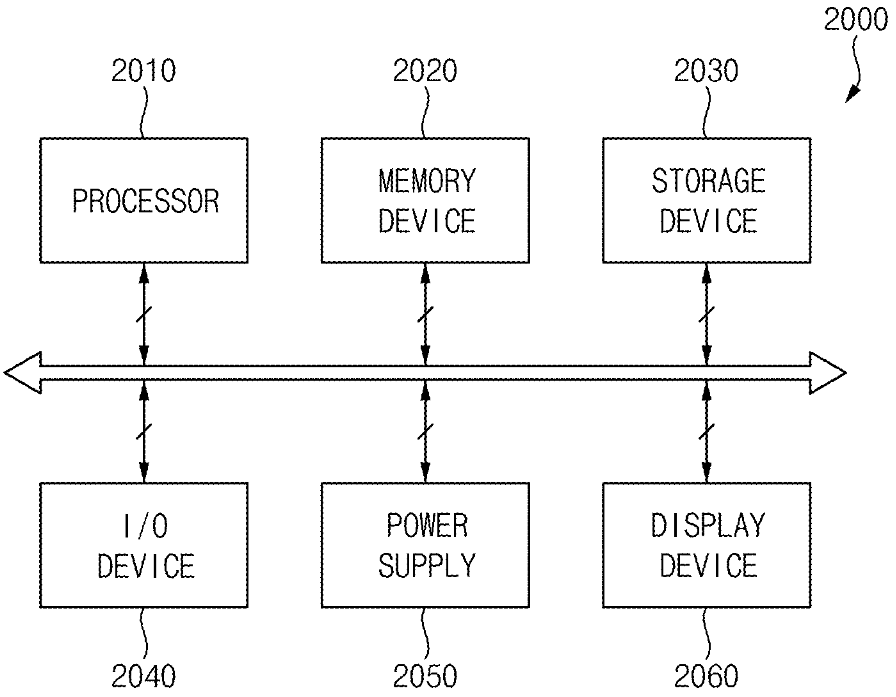
FIG. 14 is a block diagram illustrating an electronic device according to one or more embodiments.
Figure 15:
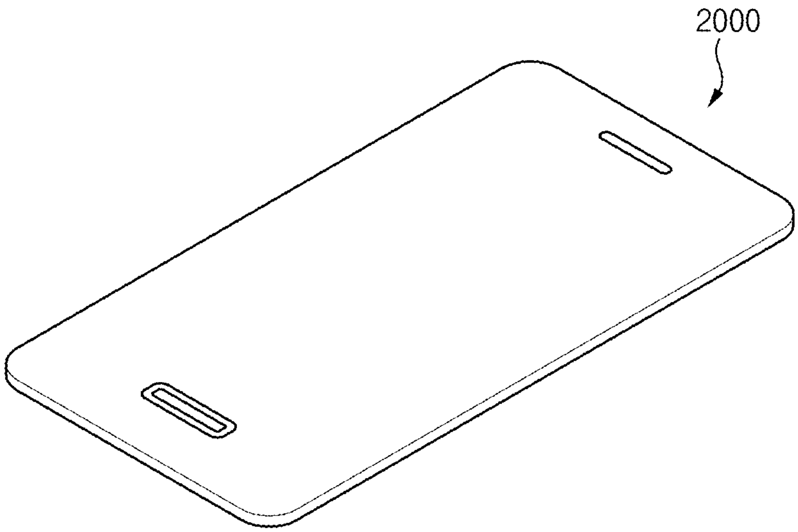
FIG. 15 is a diagram illustrating the electronic device of FIG. 14 is implemented as a smart phone according to one or more embodiments.

FIG. 14 is a block diagram illustrating an electronic device 2000 according to one or more embodiments. FIG. 15 is a diagram illustrating the electronic device 2000 of FIG. 14 is implemented as a smart phone according to one or more embodiments.

Referring to FIGS. 1, 14, and 15, the an electronic device 2000 may include a processor 2010, a memory device 2020, a storage device 2030, an input/output (I/O) device 2040, a power supply 2050, and a display device 2060. The display device 2060 may be the display device of FIG. 1. In addition, the electronic device 2000 may further include ports for communicating with a video card, a sound card, a memory card, a universal serial bus (USB) device, other electronic device, and the like.

In one or more embodiments, as illustrated in FIG. 15, the electronic device 2000 may be implemented as a smart phone. However, the electronic device 2000 is not limited thereto. For example, the electronic device 2000 may be implemented as a cellular phone, a video phone, a smart pad, a smart watch, a tablet PC, a car navigation system, a computer monitor, a laptop, a head mounted display (HMD) device, and the like.

The processor 2010 may perform various computing functions. The processor 2010 may be a microprocessor, a central processing unit (CPU), an application processor (AP), and the like. The processor 2010 may be coupled to other components via an address bus, a control bus, a data bus, and the like. Further, the processor 2010 may be coupled to an extended bus such as a peripheral component interconnection (PCI) bus.

In one or more embodiments, The display device 2060 may be the display device 800 of FIG. 1. The processor 2010 may output the input image data IMG and the input control signal CONT to a driving controller 200 included in the display device 800.

The memory device 2020 may store data for operations of the electronic device 2000. For example, the memory device 2020 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like, and/or at least one volatile memory device, such as a dynamic random access memory (DRAM) device, a static random access memory (SRAM) device, a mobile DRAM device, or the like.

The storage device 2030 may include a solid state drive (SSD) device, a hard disk drive (HDD) device, a CD-ROM device, and the like.

The I/O device 2040 may include an input device such as a keyboard, a keypad, a mouse device, a touch-pad, a touch-screen, and the like, and an output device such as a printer, a speaker, and the like. In some embodiments, the I/O device 2040 may include the display device 2060.

The power supply 2050 may provide power for operations of the electronic device 2000. The display device 2060 may be connected to other components through buses or other communication links.

FIG. 15 illustrates the electronic device 2000 of one or more embodiments implemented as the smartphone, however the electronic device 2000 is not limited thereto. The electronic device 2000 may be applied to a television, a monitor, an laptop computer, and a tablet PC. In addition, the electronic device 2000 may be applied to a car.

The display device 2060 may display an image corresponding to visual information of the electronic device 2000. At this time, the display device 2060 may be an organic light-emitting display device (OLED) or quantum dot light-emitting display device (QLED). However, the display device 2060 is not limited thereto.

Present disclosure may be applied a display device and an electronic device including the display device. For example, the present disclosure may be applied to a personal computer (PC), a laptop computer, a mobile phone, a smart phone, a smart pad, a smart watch, a portable multimedia player (PMP), a personal digital assistant (PDA), and a music player, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of various embodiments and is not to be construed as limited to the embodiments disclosed, and that modifications to the disclosed embodiments, as well as other embodiments, are intended to be included within the scope of the appended claims, with functional equivalents thereof to be included therein.

What is claimed is:

1. A display device comprising:

a driving controller configured to generate output image data based on input image data;

a data driver configured to generate data voltages based on the output image data; and a display panel configured to display an image based on the data voltages, wherein the driving controller is further configured to:

divide the display panel into blocks comprising a pixel;

calculate accumulated degradation data for the blocks based on the output image data;

calculate lifetime data representing remaining lifetimes of the blocks based on the accumulated degradation data;

compare a difference value between one of the lifetime data for a first block of the blocks and one of the lifetime data for a second block of the blocks adjacent to the first block with a threshold value;

determine a block with larger lifetime data between the first block and the second block as a long lifetime block when the difference value is greater than or equal to the threshold value;

generate forced degradation data to degrade the long lifetime block; and generate the output image data by applying the forced degradation data to the input image data.

2. The display device of claim 1, wherein the driving controller is configured to determine an afterimage boundary between the first block and the second block based on the difference value being greater than or equal to the threshold value.

3. The display device of claim 2, wherein the afterimage boundary comprises a horizontal afterimage boundary between the first block and the second block that is vertically adjacent to the first block.

4. The display device of claim 2, wherein the afterimage boundary comprises a vertical afterimage boundary between the first block and the second block that is horizontally adjacent to the first block.

5. The display device of claim 1, wherein the forced degradation data for the long lifetime block comprise a gain value applied to the input image data for the long lifetime block.

6. The display device of claim 5, wherein the gain value is configured to be determined according to a gray level of the input image data for the long lifetime block.

7. The display device of claim 6, wherein the gain value is configured to increase as the gray level of the input image data for the long lifetime block decreases.

8. The display device of claim 5, wherein the gain value is configured to be determined according to a saturation level of the input image data for the long lifetime block.

9. The display device of claim 8, wherein the gain value is configured to increase as the saturation level of the input image data for the long lifetime block increases.

10. The display device of claim 5, wherein the driving controller is configured to receive an attention signal having a first level when an attention of a user is detected, and is configured to receive the attention signal having a second level when the attention of the user is not detected, and wherein the gain value is configured to have a maximum value when the driving controller receives the attention signal having the second level.

11. The display device of claim 1, wherein the forced degradation data for the long lifetime block comprise gain values applied to the input image data for the long lifetime block.

12. The display device of claim 11, wherein the gain values comprise:

a first gain value determined according to a gray level of the input image data for the long lifetime block; and a second gain value determined according to a saturation level of the input image data for the long lifetime block.

13. The display device of claim 12, wherein the first gain value is configured to increase when the gray level of the input image data for the long lifetime block decreases, and wherein the second gain value is configured to increase when the saturation level of the input image data for the long lifetime block increases.

14. A display device comprising:

a driving controller configured to generate output image data based on forced degradation data;

a data driver configured to generate data voltages based on the output image data; and a display panel configured to display an image based on the data voltages, wherein the driving controller is further configured to:

divide the display panel into blocks comprising a pixel, calculate accumulated degradation data corresponding to the blocks based on the output image data, calculate lifetime data corresponding to remaining lifetimes of the blocks based on the accumulated degradation data, compare a difference value between one of the lifetime data for a first block of the blocks and one of the lifetime data for a second block of the blocks with a threshold value, determine a block with larger lifetime data between the first block and the second block as a long lifetime block when the difference value is greater than or equal to the threshold value, generate forced degradation data to degrade the long lifetime block, and generate the forced degradation data as the output image data.

15. The display device of claim 14, wherein the driving controller is configured to receive an attention signal having a first level when an attention of a user is detected, and to receive the attention signal having a second level when the attention of the user is not detected, and wherein the forced degradation data comprise a gray level value for emitting light at a brightness for the pixel of the long lifetime block when the driving controller receives the attention signal having the second level.

16. The display device of claim 15, wherein the brightness is a maximum brightness of the pixel of the long lifetime block.

17. An electronic device comprising:

a processor configured to provide input image data;

a driving controller configured to generate output image data based on input image data;

a data driver configured to generate data voltages based on the output image data; and a display panel configured to display an image based on the data voltages, wherein the driving controller is further configured to:

divide the display panel into blocks comprising a pixel;

calculate accumulated degradation data for the blocks based on the output image data;

calculate lifetime data representing remaining lifetimes of the blocks based on the accumulated degradation data;

compare a difference value between one of the lifetime data for a first block of the blocks and one of the lifetime data for a second block of the blocks adjacent to the first block with a threshold value;

determine a block with larger lifetime data between the first block and the second block as a long lifetime block when the difference value is greater than or equal to the threshold value;

generate forced degradation data to degrade the long lifetime block; and generate the output image data by applying the forced degradation data to the input image data.

18. The electronic device of claim 17, wherein the forced degradation data for the long lifetime block comprise gain values applied to the input image data for the long lifetime block.

19. The electronic device of claim 18, wherein the gain values comprise:

a first gain value determined according to a gray level of the input image data for the long lifetime block; and a second gain value determined according to a saturation level of the input image data for the long lifetime block.

20. The electronic device of claim 19, wherein the first gain value is configured to increase when the gray level of the input image data for the long lifetime block decreases, and wherein the second gain value is configured to increase when the saturation level of the input image data for the long lifetime block increases.

* * * * *